2,729,652

PRODUCTION OF DEHYDRACETIC ACID

Herbert Nordt, Leverkusen-Bayerwerk, Germany, assignor to Farbenfabriken Bayer Aktiengesellschaft, Leverkusen, Germany, a corporation of Germany No Drawing. Application April 22, 1954,
Serial No. 425,037

Claims priority, application Germany April 24, 1953

4 Claims. (Cl. 260—343.5)

This invention relates to the production of dehydracetic acid and is more particularly concerned with an improvement in the production of dehydracetic acid from diketene.

As disclosed by Albert B. Boese, Jr., in U. S. Patent No. 2,229,204 dehydracetic acid may be obtained by polymerizing diketene in an inert solvent in the presence of a basic polymerization catalyst at a temperature within the range of about 30° C. to about 150° C.

Among the inert solvents mentioned in the above patent are aromatic hydrocarbons such as benzene, and toluene; and ethers such as dioxane and diethyl ether. Basic polymerization catalysts used in the method are the alkali metal salts of organic hydroxylic compounds, such as sodium phenolate and sodium ethylate; alkali metal hydroxides such as sodium and potassium hydroxide; and tertiary Le A 2018–A amines such as pyridine and its homologues, quinoline, N-ethylmorpholine and triethylamine. The yields indicated in the examples of the patent range from 44 to 78% of the theoretical.

I have repeated the experiments described in said U. S. Patent No. 2,229,204, but the highest yield obtained did not exceed 58%. Actually, Albert B. Boese himself states a yield of only 54% in a paper (Journal of Organic Chemistry, vol. 14 (1949), pages 460–465) published after the issuance of his above patent.

It is an object of the present invention to provide a dependable process for the production of dehydracetic acid. Another object is to provide a process for the production of dehydracetic acid in high yields and in a high state of purity. A further object is to provide a process which is suitable for large scale operation. Still further objects will appear hereinafter.

These objects are attained in accordance with the present invention by polymerizing diketene in the presence of a basic polymerization catalyst in acetic anhydride at temperatures within the range of 0° C. to 30° C.

This finding is most surprising for two reasons. In the first place, it is well known that acetic anhydride is very reactive in the presence of alkali. Thus, it was to be expected that side reactions between acetic anhydride and diketene or the dehydracetic acid formed would occur. In other words, acetic anhydride could not be considered an inert solvent. In the second place, it is known (see the above cited patent, page 1, left column, lines 38–50) that, when diketene is added at room temperature to a solvent containing a polymerization catalyst, the polymerization reaction frequently does not begin until a large amount of diketene has been added. Then the polymerization may begin with explosive violence. Hence, it was to be expected that the reaction could not be controlled at temperatures below 30° C.

Representative examples of the basic polymerization catalysts which are useful to this invention include, among others, the alkali metal salts of certain acids such as sodium acetate, potassium acetate, the sodium salt of dehydracetic acid and trisodiumphosphate; the alkali metal salts of organic hydroxylic compounds such as sodium phenolate and sodium ethylate; alkali metal hydroxides such as sodium and potassium hydroxide; and tertiary amines such as pyridine and its homologues, quinoline, N-ethyl morpholine and triethylamine. Depending upon their activity, these catalysts are dissolved in acetic anhydride, which serves as the solvent in accordance with the process of the invention, in such amounts that the dimerization reaction of diketene to form dehydracetic acid proceeds at a reasonable velocity. In general, amounts of from about 0.05 to about 0.3% by weight based on the amount of acetic anhydride used, will be suitable. However, greater catalyst concentrations may be employed, if the heat of reaction can be abstracted.

The invention makes it possible to obtain dehydracetic acid from diketene in yields up to 83%. Another attractive feature of the invention is that low-grade diketene may be employed as the starting material whereas heretofore diketene of at least 99% purity had to be employed to obtain a high yield.

The invention is further illustrated by the following examples without being restricted thereto. The parts mentioned are by weight.

Example 1

500 parts of 93% diketene are mixed with a solution of 2 parts of anhydric sodium acetate in 1082 parts of acetic anhydride at room temperature. The mixture is stirred while cooling so as to maintain the temperature at about 20° C. On the next day, another portion of 500 parts of 93% diketene is added. Thus a light-red solution, from which dehydracetic acid begins to crystallize, is obtained. Stirring is continued for 3–4 days at about 20° C. Upon neutralization of the catalyst by adding the equivalent amount of concentrated sulfuric acid or phosphoric acid, the solvent and unchanged diketene (2–5% of the quantity used) are distilled off in vacuum until a dry residue is obtained. The acetic anhydride and diketene thus recovered may be used for the next run. The distillation residue consists of 895 parts of a solid light-red mass from which 765 parts of pure dehydracetic acid melting at 108° C. may be recovered by sublimation at 100–120° C./0.1–0.5 mm., which correspond to a yield of 82% of the theoretical. The sublimation residue consists of 122 parts (13%) of a dark-brown brittle resin.

Example 2

200 parts of 99% diketene are stirred for 3–4 days at room temperature with a mixture of 0.6 part of anhydric potassium acetate in 433 parts of acetic anhydride as described in Example 1. Then the precipitated dehydracetic acid which is of a light-yellow color is filtered off by suction. To the mother liquor there is added as much diketene as is equivalent to the proportions of dehydracetic acid filtered off. After another 3–4 days, the precipitated dehydracetic acid is again filtered off by suction and to the mother liquor there is added the equivalent amount of diketene. This operation may be repeated 5 times using altogether 500 parts of diketene. Then the solution is neutralized and the solvent is distilled off under reduced pressure. The portions of dehydracetic acid recovered and the distillation residue are purified by sublimation. Thus 82% of pure dehydracetic acid and 16.5% of by-products are obtained.

Example 3

50 parts of 99% diketene are mixed at room temperature with a solution of 0.8 part of the anhydrous sodium salt of dehydracetic acid in 622 parts of acetic anhydride thereby obtaining a mixture which contains 8% by weight of diketene. After 4 days the light-red mixture is worked up as described in Example 1. The yield of pure dehydracetic acid amounts to 83.5%.

*Example 4*

In a vessel made of stainless steel, enamelled iron or aluminum and provided with a cooling jacket there are placed 1190 parts of acetic anhydride. 1 part of anhydric sodium acetate are dissolved in this quantity of acetic anhydride by stirring for 2 hours. Thereupon 540 parts of 92% diketene are added to the mixture over a period of 2-4 hours while stirring and maintaining the temperature within the range of 16-20° C. by cooling with water. On the next day 270 parts of 92% diketene are added over a period of 2 hours. The same amount (270 parts) of diketene is added on the 3rd, 4th, 5th and 6th day. Thus, a total amount of 1890 parts of 92% diketene, corresponding to 1740 parts of 100% diketene, is reacted. On the 3rd and on the 5th day, each time about 8 hours before the addition of diketene, a suspension of 1 part of anhydric sodium acetate in about 3 parts of acetic anhydride is added to the mixture. Generally on the 2d day dehydracetic acid begins to crystallize out.

The temperature of the mixture is maintained within the range of 16-20° C. throughout the whole operation. After adding the last portion of diketene the mixture is stirred for an additional 3-4 days at the same temperature until a sample withdrawn from the mixture contains less than 3% of unchanged diketene, based on the quantity used. Now the precipitated dehydracetic acid is filtered off by suction, washed with aqueous methanol (2 parts of water to 1 part of methanol) and dried. Thus, 1235 parts (71%) of light-yellow crude dehydracetic acid are obtained. By sublimation 1178 parts of pure dehydracetic acid melting at 108° C. are recovered therefrom. This corresponds to a yield of 67.7% of the theoretical. The mother liquor is evaporated to dryness by distillation in vacuum thereby recovering the acetic anhydride used as the solvent and the unchanged diketene. The distillate may be used as the solvent for a subsequent run. The distillation residue, 425 parts of a brown brittle resin, is melted by heating to about 70° C. and the melt is distilled by means of a falling film evaporator at a temperature of 141-147° C./3-4 mm. Thus, 208 parts of light-yellow dehydracetic acid are obtained. By sublimation 200 parts of pure dehydracetic acid melting at 108° C. may be recovered from the crude product. The overall yield of sublimated dehydracetic acid amounts to 1378 parts, which corresponds to a yield of 79% of the theoretical.

Although the foregoing specification comprises preferred embodiments of the invention, it is to be understood that the invention is not limited to the exact details shown and described, and that variations and modifications may be made without departing from the scope of the invention as defined in the appended claims.

I claim:

1. In the process for the production of dehydracetic acid wherein diketene is polymerized in the presence of a basic polymerization catalyst, the improvement which comprises carrying out the polymerization in acetic anhydride at temperatures within the range of about 0° C. to about 30° C.

2. Process for the production of dehydracetic acid which comprises adding diketene to a mixture comprising acetic anhydride and a basic polymerization catalyst at temperatures within the range of about 0° C. to about 30° C., and recovering the dehydracetic acid formed from the reaction mixture.

3. Process for the production of dehydracetic acid which comprises adding diketene to a 0.05-0.3% solution of a basic polymerization catalyst in acetic anhydride at a temperature within the range of about 0° C. to about 30° C., and recovering the dehydracetic acid formed from the reaction mixture.

4. Process in accordance with claim 3, in which said basic polymerization catalyst is an alkali salt of a member selected from the group consisting of acetic acid and dehydracetic acid.

References Cited in the file of this patent

UNITED STATES PATENTS 2,229,204    Boese _____ Jan. 21, 1941

FOREIGN PATENTS 384,872    Canada _____ Oct. 31, 1939

OTHER REFERENCES

Boese: Ind. Eng. Chem. 32, pp. 16-22 (1940).
Chick et al.: J. C. S., 97, p. 1998 (1910).